Nov. 25, 1958  W. BALTZ  2,861,544
SELF FEEDING SILO
Filed July 5, 1955  2 Sheets-Sheet 1
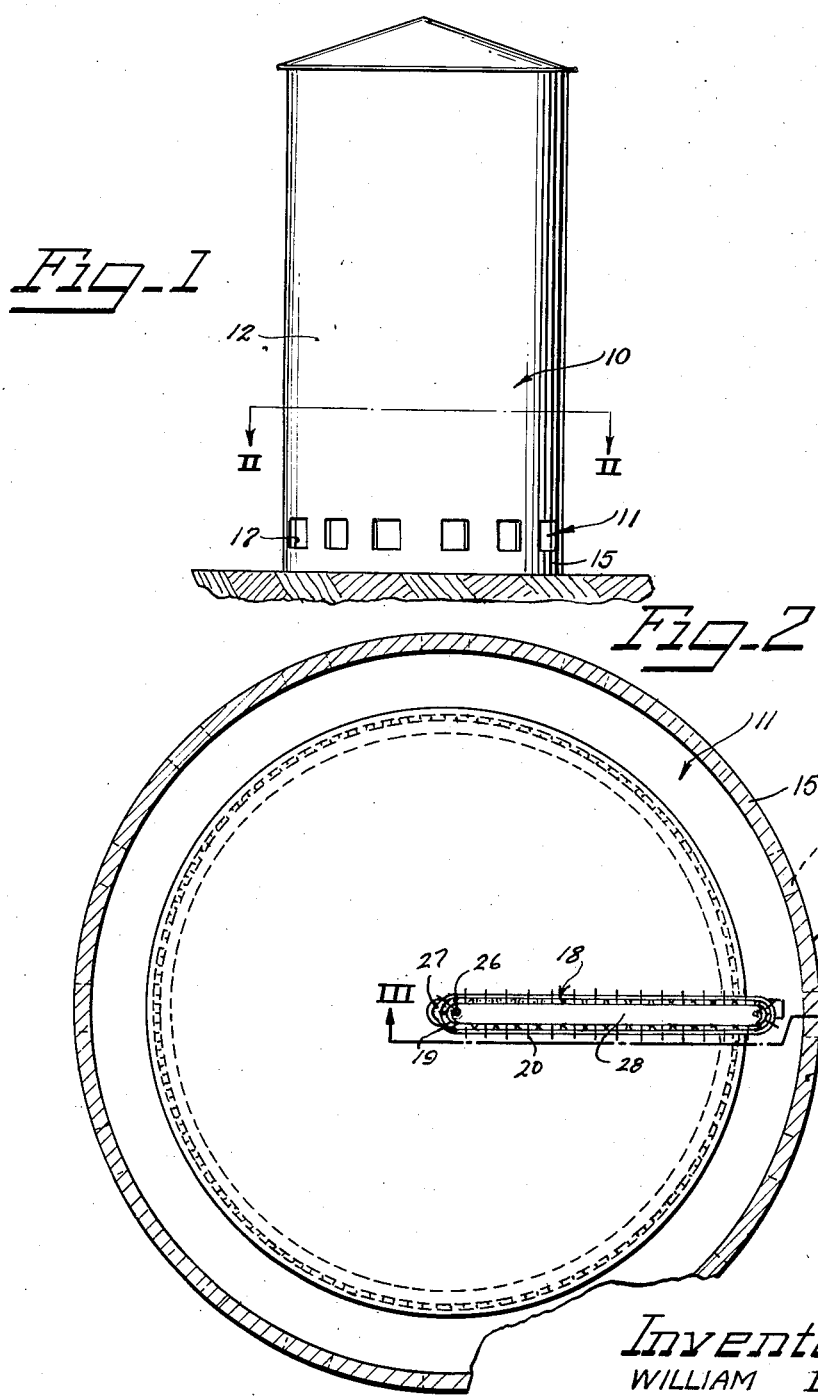
Inventor
WILLIAM BALTZ

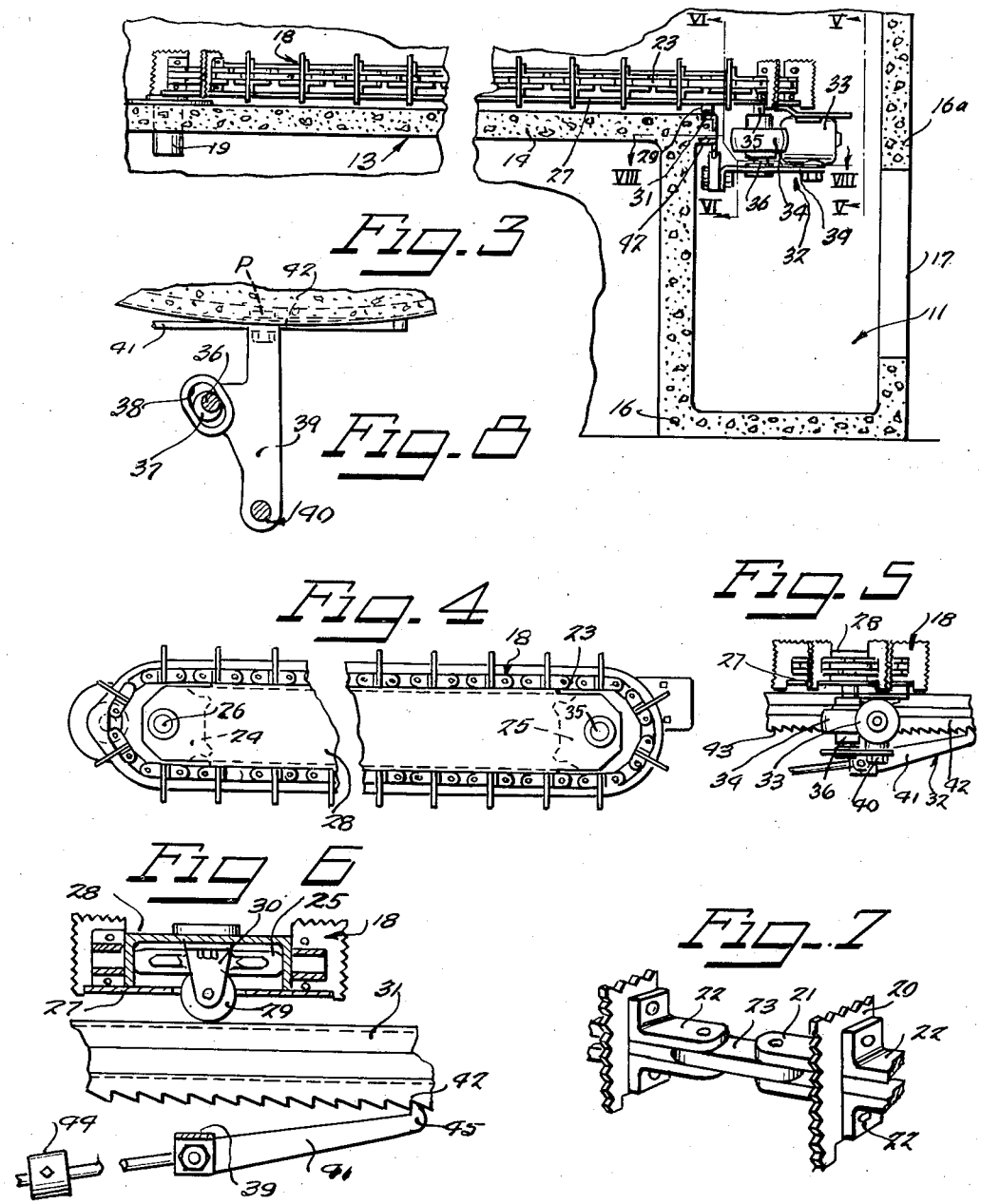

United States Patent Office 2,861,544
Patented Nov. 25, 1958

2,861,544

SELF FEEDING SILO

William Baltz, Pocahontas, Ark.

Application July 5, 1955, Serial No. 519,793

11 Claims. (Cl. 119—52)

This invention relates generally to a feeding device for livestock and more particularly to a feeding device for silos or the like.

One of the most time consuming chores presently facing the livestock raiser is having to regularly feed his stock. In so doing, farmers utilize many hours of labor in hauling, distributing and otherwise providing for the needs of the livestock. In the winter, oftentimes silage becomes impacted and frozen in the silo thus necessitating more labor in order to relieve the blockage.

Accordingly, an object of this invention is to provide a labor and time saving self-feeding silo which greatly alleviates these hardships.

Another object of this invention is to provide a feeder device which minimizes waste while at the same time lends itself to pushbutton control.

Still another object of this invention is to provide a silo feeder device which draws corn and the like from the storage bin and distributes the same to the silage receiving and distributing area and more particularly to the spaced feeding stations about the perimeter of the silo.

A further object of this invention is to provide a silo feeder device which is economically manufactured and lends itself to ready repair.

Other objects, features and advantages may more fully appear from the following detailed description taken in conjunction with the accompanying drawings which illustrate a single embodiment thereof and in which:

Figure 1 is a side elevational view of my novel self-feeding silo;

Figure 2 is an enlarged fragmentary transverse cross-sectional view taken on the line II—II of Figure 1, embodying features of the present invention;

Figure 3 is an enlarged fragmentary longitudinal cross-sectional view taken substantially on the line III—III of Figure 2 showing in greater detail my novel apparatus;

Figure 4 is an enlarged fragmentary detailed view of my conveyor apparatus;

Figure 5 is an enlarged fragmentary side elevational view taken substantially on the line V—V of Figure 3;

Figure 6 is an enlarged fragmentary elevational view taken substantially on the line VI—VI of Figure 3;

Figure 7 is an enlarged fragmentary detailed view of the linkage and flights on the conveyor apparatus; and Figure 8 is an enlarged fragmentary detail view taken substantially on the line VIII—VIII of Figure 3.

As shown on the drawings:

The reference numeral 10 indicates generally a vertically extending circular type silage feeder having a plurality of circumferentially spaced feeding stations accessible to a manger 11 generally about the outer margin or perimeter of the silo 10. The silo may be made of any suitable material.

As is best seen in Figure 2, an exterior circular wall surface or housing 12 is suitably mounted upon a concrete platform 13 (Figure 3). The platform 13 includes a main elevational horizontal load sustaining area 14 and is connected at its outer perimeter to an annular vertical side wall 15 (Figures 1 and 2) which is in turn connected at its other end to an annular base portion 16 upon which the outer annular side wall 16a is carried. It will be appreciated that the side wall 15, the base portion 16, the side wall 16a of the housing 12 define an enclosed annular silage receiving and distributing area or manger. The side wall 16a adjacent its junction with the base portion 16 has a plurality of circumferentially spaced openings 17 into which the livestock may extend their heads to feed.

A horizontally movable conveyor assembly or endless drive 18 is preferably pivotally anchored at sleeve bearing 19, the mid point of the circular silo. As is best seen in Figure 7, conveyor 18 has a plurality of spaced vertically extending serrated flights or cleats 20 provided with mountings 21 and reinforced mountings 22 riveted on opposite sides of each of the flights. Pivotally mounted links 23 are utilized to connect each of the flights together to constitute an endless belt of flights. The belt is carried upon sprocket 24 and drive sprocket 25 which are radially spaced from one another. Sprocket 24 has a bearing mounted at 26 on a plate 27 which plate is connected to the anchored pivot 19 at one end and to an overlying channel 28 at the other end. Protective channel 28 which aids in preventing jamming of the mechanism overlies and extends substantially coextensive with the length of the conveyor 18 and is supported at its generally radially outer end upon a roller 29 which is attached to the channel by means of a roller mounting 30 (Fig. 6). The roller 29 is movable upon a guideway or track 31 carried by the platform 13.

The endless belt of flights are adapted to move over the relatively smooth surfaced plate 27 which is joined with the pivot mounting 19 at one end and supported by the channel 28 and roller 29 adjacent its opposite end. This plate by reason of its smooth surface serves to minimize friction as the flights slide over same and additionally serve as a protective cover for the conveyor rotating mechanism 32.

The plate 27 has secured at its radially outer underside a motor or prime mover 33 which is suitably connected to a conventional worm drive reducer 34; both motor and reducer constituting elements of the mechanism 32.

A rotatable shaft 35 (Figures 3 and 5) extends from one end of the reducer 34 through the plate 27 to drive and support the drive sprocket 25. A second rotatable shaft 36 (Figures 3 and 5) extends from the lower end of the reducer 34 and is rotatably connected to an eccentric cam 37 mounted within a slot 38 on a link or arm 39. To provide the arm 39 with some additional support and a pivot point, it is pivotally carried at the lower end of the motor housing at 40. The other end of the link 39 is pivotally connected at P (Figure 8) by a pin to a lever or pawl 41. Operable in conjunction with the pawl 41, and suitably secured to the platform 13, is a ratchet or circular band 42 having a plurality of circumferentially spaced teeth 43.

In the operation of my self-feeding silo, the operator through pushbutton control may start the motor 33 which in turn motivates the worm reducer drive 34. Both shafts 35 and 36, through suitable gearage are rotated at predetermined rates of speed. The rotation of shaft 35 causes the sprocket 25 to be driven. As the conveyor belt is driven about the spaced sprockets stored silage is picked up and carried radially outwardly and is dumped into the manger 11 opposite one of the feeding openings 17.

The other rotatable shaft 36 is connected to an eccentrically mounted cam which causes the pawl or gripping lever 41 to move forward over one tooth on the circular band or ratchet 42 and into engagement with the next tooth with each revolution of the shaft 36. Positive engagement between the pawl and ratchet is suitably insured through the use of a weight 44 which continually urges the lower end of the pivotally mounted pawl further downward while at the same time positively engaging the hooked end 45 into engagement with one of the teeth 43.

It will now be appreciated that as the motor drives the worm drive reducer not only is silage conveyed from the interior of the silo to the outer feeding station, but in addition, the conveyor is pivotally moved at a predetermined rate in such a manner that silage may be deposited entirely around the perimeter of the silo in the manger.

By reason of the advantageous positioning and employment of the plate 27 and channel 28, means are provided to minimize any possibility that the conveyor 18 and conveyor rotating mechanism 32 become jammed.

It will be understood that modifications and variations may be effected without departing from the scope of the novel concepts of the present invention.

I claim as my invention:

1. In a feeding device for a circular silo including a platform and having feeding stations about the outer perimeter of the silo, a ratchet on the platform, a plate having radially inner and outer ends with its inner end pivotally mounted at generally the mid point of the silo, said plate being supported by a platform engaging roller bearing at its generally radially outer end a radially extending driven conveyor on said plate discharging feed directly into the feeding stations, a prime mover connected to said plate, an eccentrically driven link connected to said prime mover, and a pawl pivotally connected to said link and operable with said ratchet to rotate the conveyor to progressively supply the feeding stations about the perimeter of the silo.

2. In a feeding device for a circular silo including a platform and having feeding stations about the outer perimeter of the silo, a ratchet connected to the platform, a plate having radially inner and outer ends with its inner end pivotally mounted at generally the mid point of the silo, said plate supported by a platform engaging bearing at its generally radially outer end, a radially extending driven conveyor on said plate unloading directly into the feeding stations, a prime mover connected to said plate, a speed reducer connected to said mover, an eccentrically driven link connected to said reducer, and a pawl pivotally connected to said link and operable with said ratchet to rotate the conveyor to progressively supply the feeding stations about the perimeter of the silo.

3. In a feeding device for a circular silo including a platform and having feeding stations about the outer perimeter of the silo, a ratchet connected to the platform, a plate having radially inner and outer ends with its inner end pivotally mounted at generally the mid point of the silo, said plate supported by a platform engaging bearing at its generally radially outer end, a radially extending driven conveyor on said plate unloading directly into the feeding stations, a prime mover connected to said plate, a speed reducer connected to said mover, an eccentrically driven link connected to said reducer, and a pawl pivotally connected to said link and operable with said ratchet to rotate the conveyor to progressively supply the feeding stations about the perimeter of the silo, said reducer driving both said conveyor and said eccentric link.

4. In a feeding device for a silo having feeding stations generally about the outer perimeter of same, a ratchet adjacent the feeding stations and having ratchet teeth, a centrally disposed generally radially extending driven conveyor in communication with a feeding station, a driven pawl connected to said conveyor operable with said ratchet to rotate the driven conveyor to progressively supply the feeding stations, said pawl comprising a pivotally mounted arm having a hook at one end cooperable with said ratchet tooth and means at the other end of said pawl to urge the hook into positive engagement with the ratchet.

5. A silo for ensilage comprising a base having an elevated platform for carrying ensilage, said base having a manger below and about said platform, a protective housing overlying said base, manger and platform and having a series of openings in said housing defining feeding stations about the bottom of said housing and having access to said manger, a radially extending conveyor mechanism including a single conveyor on said platform having flights to move ensilage outwardly and dump the same into the manger and having a central pivot at the midpoint of said circular platform about which the conveyor mechanism rotates, gearage coacting between said conveyor and said base by which said conveyor mechanism is driven circumferentially about its pivot and said base, and a power mechanism connected to said conveyor mechanism and said gearage to drive the conveyor mechanism to move and dump the ensilage into the manger and to move the conveyor mechanism circumferentially about said pivot, said gearage including a circular gear structure disposed generally at the perimeter of said base and means connected to said conveyor actuated by said power mechanism cooperable with said gear structure circumferentially rotating said single conveyor on its central pivot.

6. In a stock feeding type of silo, a bottom structure having a circular housing thereabove for supporting a column of silage on the bottom structure, a feed trough peripherally about the bottom structure, a sweep arm silage conveyor pivotally mounted centrally on the bottom structure and extending radially substantially horizontally and with its radially outer end adjacent to the peripheral feed trough, the conveyor being operative to move silage from the central portion of the bottom structure radially outwardly to the trough, and drive means including means on the radially outer end portion of the conveyor and means on the peripheral portion of the bottom structure adjacent to the trough, said means in driving relationship with each other and coacting to drive the conveyor including pivotal sweeping movement of the conveyor over the bottom structure under the silage column for dislodging silage from the lower end of the column and movement of the dislodged silage radially outwardly by the conveyor to the feed trough.

7. A silo as defined in claim 6, wherein the drive means for driving the conveyor comprises mechanism for intermittently advancing the conveyor in its pivotal movement over the bottom structure.

8. In a stock feeding type of silo, a bottom structure including a peripheral portion and having a circular housing thereabove for supporting a column of silage on the bottom structure, a feed trough peripherally about the bottom structure, a sweep arm silage conveyor pivotally mounted centrally on the bottom structure and extending radially substantially horizontally and with its radially outer end adjacent to the peripheral feed trough, the conveyor being operative to move silage from the central portion of the bottom structure radially outwardly to the trough, and drive means including means on the radially outer end portion of the conveyor and means on the peripheral portion of the bottom structure adjacent to the trough, said means in driving relationship with each other and coacting to drive the conveyor including pivotal sweeping movement of the conveyor over the bottom structure under the silage column for dislodging silage from the lower end of the column and movement of the dislodged silage radially outwardly by the conveyor to the feed trough, said housing having a lower wall portion disposed in generally closing relation about the trough and provided with circumferentially spaced openings into which livestock may extend their heads to feed from the trough.

9. In a stock feeding type of silo, a bottom structure having a circular housing thereabove for supporting a column of silage on the bottom structure, a sweep arm silage conveyor pivotally mounted centrally in the bottom structure and extending radially substantially horizontally and with its radially outer end adjacent to the peripheral feed trough, the conveyor being operative to move silage from the central portion of the bottom structure radially outwardly to the trough, and drive means including means on the radially outer end portion of the conveyor and means on the peripheral portion of the bottom structure adjacent to the trough, said means in driving relationship with each other and coacting to drive the conveyor including pivotal sweeping movement of the conveyor over the bottom structure under the silage column for dislodging silage from the lower end of the column and movement of the dislodged silage radially outwardly by the conveyor to the feed trough, said housing having a lower wall portion disposed in generally closing relationship about the trough and provided with circumferentially spaced openings into which livestock may extend their heads to feed from the trough, said bottom structure on which the conveyor is pivotally mounted being at an elevated position relative to said openings and the radially outer end of the conveyor being disposed above the openings and with the bottom of the feed trough located below the openings.

10. In a stock feeding type of silo, a bottom structure having a circular housing thereabove, for supporting a column of silage on the bottom structure, a feed trough peripherally about the bottom structure, a sweep arm silage conveyor pivotally mounted centrally on the bottom structure and extending radially substantially horizontally and with its radially outer end adjacent to the peripheral feed trough, the conveyor being operative to move silage from the central portion of the bottom structure radially outwardly to the trough, and drive means including means on the radially outer end portion of the conveyor and means on the peripheral portion of the bottom structure adjacent to the trough, said means in driving relationship with each other and coacting to drive the conveyor including pivotal sweeping movement of the conveyor over the bottom structure under the silage column for dislodging silage from the lower end of the column and movement of the dislodged silage radially outwardly by the conveyor to the feed trough, the radially outer end portion of the conveyor projecting into overlying relation to the trough and carrying a prime mover and gearage comprising part of the driving means for the conveyor.

11. In a stock feeding type of silo, a bottom structure having a circular housing thereabove for supporting a column of silage on the bottom structure, a feed trough peripherally about the bottom structure, a sweep arm silage conveyor pivotally mounted centrally on the bottom structure and extending radially substantially horizontally and with its radially outer end adjacent to the peripheral feed trough, the conveyor being operative to move silage from the central portion of the bottom structure radially outwardly to the trough, and drive means including means on the radially outer end portion of the conveyor and means on the peripheral portion of the bottom structure adjacent to the trough, said means in driving relationship with each other and coacting to drive the conveyor including pivotal sweeping movement of the conveyor over the bottom structure under the silage column for dislodging silage from the lower end of the column and movement of the dislodged silage radially outwardly by the conveyor to the feed trough, the radially outer end portion of the conveyor projecting into overlying relation to the trough and carrying a prime mover and gearage comprising part of the driving means for the conveyor, the bottom structure having a circular track adjacent to its periphery and the conveyor having antifriction means engaging said track to facilitate pivotal movements of the conveyor.

References Cited in the file of this patent
UNITED STATES PATENTS

| | | |
|---|---|---|
| 2,635,770 | Tiedeman | Apr. 21, 1953 |
| 2,704,995 | Dueringer | Mar. 29, 1955 |
| 2,736,461 | Dueringer et al. | Feb. 28, 1956 |
| 2,755,770 | Ruedemann | July 24, 1956 |
| 2,755,771 | Martin | July 24, 1956 |